US011781353B2

(12) United States Patent
Neuman et al.

(10) Patent No.: US 11,781,353 B2
(45) Date of Patent: Oct. 10, 2023

(54) SYSTEMS AND METHODS FOR MONITORING DOOR OPENING EVENTS

(71) Applicant: SILICON CONTROLS PTY LTD, Macquarie Park (AU)

(72) Inventors: Michael Alexander St. Leger Neuman, Milson Point (AU); John Richard Haddy, Lane Cove (AU); Robert William Gerald Battye, Wahroonga (AU)

(73) Assignee: SILICON CONTROLS PTY LTD.

( * ) Notice: Subject to any disclaimer, the term of this patent is extended or adjusted under 35 U.S.C. 154(b) by 0 days.

(21) Appl. No.: 17/307,785

(22) Filed: May 4, 2021

(65) Prior Publication Data

US 2021/0254376 A1    Aug. 19, 2021

Related U.S. Application Data

(62) Division of application No. 16/395,580, filed on Apr. 26, 2019.

(30) Foreign Application Priority Data

Apr. 27, 2018 (AU) ................. 2018202899

(51) Int. Cl.
*E05C 19/16* (2006.01)
*B65G 1/04* (2006.01)
*G06Q 10/087* (2023.01)

(52) U.S. Cl.
CPC .......... *E05C 19/166* (2013.01); *B65G 1/0485* (2013.01); *G06Q 10/087* (2013.01)

(58) Field of Classification Search
None
See application file for complete search history.

(56) References Cited

U.S. PATENT DOCUMENTS 8,773,237 B2 * 7/2014 Burris ................ G05B 19/0426
324/130
2006/0192673 A1    8/2006 Irwin
(Continued)

FOREIGN PATENT DOCUMENTS

AU        2018202899 B1       5/2018
DE    102018106879 A1 *      9/2019
(Continued)

*Primary Examiner* — Adolf Dsouza
(74) *Attorney, Agent, or Firm* — Rita C. Chipperson, Esq.; Chipperson Law Group, P.C.

(57) ABSTRACT

A method to automatically audit the number of units within an enclosure having at least one door including receiving from a remote telemetry device data indicating the number of times within a predetermined period of time a door has been opened to a predetermined open position relative to the enclosure, the predetermined open position of the door being specifically calibrated by a sensor device being mechanically set when the sensor device is installed on the enclosure proximal to the door as a position of the door between a closed position and a more fully opened position beyond the predetermined open position, to generate a door opening count, the remote telemetry device includes a sensor configured to be adjustably calibrated to sense when the door is at the predetermined open position relative to the enclosure based upon the adjustable calibration, to generate the door opening count.

12 Claims, 8 Drawing Sheets

(56) References Cited

U.S. PATENT DOCUMENTS

| | | |
|---|---|---|
| 2009/0015400 A1 | 1/2009 | Breed |
| 2010/0276267 A1 | 11/2010 | King |
| 2012/0014497 A1 | 1/2012 | Longyear |
| 2016/0187368 A1 | 6/2016 | Modi et al. |
| 2017/0318964 A1* | 11/2017 | McKnight .............. A47B 95/02 |
| 2017/0363345 A1 | 12/2017 | Choi et al. |
| 2019/0330892 A1 | 10/2019 | Neuman et al. |

FOREIGN PATENT DOCUMENTS

| | | |
|---|---|---|
| EP | 0445531 A1 | 2/1991 |
| WO | 2015/023765 A1 | 2/2015 |
| WO | 2017/127035 A1 | 7/2017 |

* cited by examiner

SYSTEMS AND METHODS FOR MONITORING DOOR OPENING EVENTS

RELATED APPLICATION

This application is a divisional of U.S. patent application Ser. No. 16/395,580 filed Apr. 26, 2019, which claims priority to and the benefit of Australia Patent Application No. 2018202899 filed Apr. 27, 2018, which are incorporated by reference herein in their entirety.

TECHNICAL FIELD

The present disclosure relates to systems and methods for monitoring door opening events, and more particularly, to calibrating door opening sensors for specific door opening events. The present disclosure further relates to making predictions of the number of units within an enclosure based upon data gathered by one or more sensors.

BACKGROUND

Enclosures are built for many different purposes. Paddocks, pens, yards and cages are examples of enclosures. Buildings, boxes and bags of any kind are also enclosures. Enclosures are used to keep items, animate and/or inanimate therein, or to keep items out of the enclosure. Any material out of which an enclosure is made, or its purpose is within this definition of enclosures. Typically access to an enclosure of a space is through an opening of the enclosure that can be secured by, for example in the case of buildings, paddocks etc., a door or a gate.

Enclosures are designed and built for storing specific types of products. For example, retail outlets and petrol stations commonly house gas cylinders in a locked outdoor storage cage. Customers are typically given a key to open the storage cage on their own to access and swap an empty cylinder for a full cylinder. The inventory in the cage is usually owned and managed by a separate gas cylinder supply business, and the operator of the retail outlet is generally not responsible for monitoring or advising the gas cylinder supply business of the inventory level, which presents a problem of inventory and distribution management.

Another example of an enclosure built for storing a specific type of product is an ice freezer that is typically outside of a retail outlet. Typically, retail outlets are arranged so that a customer pays for the ice at an indoor cash register. The customer then goes outside the retail outlet and removes the number of bags of ice that they just purchased. Not only is inventory management a problem, but potentially theft is a problem as well.

SUMMARY

According to a first aspect, the present disclosure provides an electro-mechanical adjustable monitoring system configured to monitor door opening events of an enclosure's door connection system, the system being configured to allow a door to open to a predetermined open position relative to the enclosure wherein the door is capable of being opened to a more fully opened position beyond the predetermined open position, the monitoring system comprising: at least one sensor device configured to be adjustably calibrated when the sensor device is installed on the enclosure proximal to the door to sense when the door is at the predetermined open position relative to the enclosure the predetermined open position adjustably specifically calibrated by the sensor as a position of the door between a closed position and the more fully opened position beyond the predetermined open position, so that the sensor device is configured to detect when the door has been opened to at least the predetermined open position relative to the enclosure based upon the adjustable calibration mechanically set when the device is installed proximal to the door, the sensor device providing sensor output.

According to a second aspect, the present disclosure provides a method automatically auditing the number of units within an enclosure having at least one door, comprising: receiving from a remote telemetry device data indicating the number of times within a predetermined period of time a door has been opened to a predetermined open position relative to the enclosure, the predetermined open position of the door being specifically calibrated by a sensor device being mechanically set when the sensor device is installed on the enclosure proximal to the door as a position of the door between a closed position and a more fully opened position beyond the predetermined open position, to generate a door opening count, wherein the remote telemetry device includes a sensor configured to be adjustably calibrated to sense when the door is at the predetermined open position relative to the enclosure based upon the adjustable calibration, to generate the door opening count.

According to a third aspect, the present disclosure provides a remote telemetry device for automatically auditing the number of items within an enclosure having at least one door for removal and restocking of the items, comprising: a remote telemetry device in communication with at least one sensor device configured to be calibrated, the calibration of the sensor device being set when the sensor device is installed based upon the size of an item, the sensor configured to detect the door opening to a calibrated door open position, data indicative of the number of items within the enclosure to determine a current count.

According to a further aspect, the present disclosure provides an electro-mechanical adjustable monitoring system configured to monitor door opening events of an enclosure's door connection system, the system being configured to allow a door to open to a predetermined open position relative to the enclosure wherein the door is capable of being opened to a more fully opened position beyond the predetermined open position, the monitoring system comprising: at least one sensor device configured to be adjustably calibrated when the sensor device is installed on the enclosure proximal to the door to sense when the door is at the predetermined open position relative to the enclosure the predetermined open position adjustably specifically calibrated by the sensor as a position of the door between a closed position and the more fully opened position beyond the predetermined open position, so that the sensor device is configured to detect when the door has been opened to at least the predetermined open position relative to the enclosure based upon the adjustable calibration mechanically set when the device is installed proximal to the door, the sensor device providing sensor output.

According to a further aspect, the present disclosure provides a method of an adjustable electro-mechanical monitoring system configured to monitor an enclosure's door opening events, comprising: providing a sensor device for an enclosure having a door capable of opening to a predetermined open position relative to the enclosure wherein the door is capable of being opened to a more fully opened position beyond the predetermined open position and capable of being in a closed position, wherein the sensor device is adjustably mechanically calibrated when the device is installed on the enclosure proximal to the door to sense when the door is at the predetermined open position relative to the enclosure such that the sensor is adjustably specifically calibrated to sense when the door is at the predetermined open position and wherein when the sensor device detects when the door has been opened to at least the predetermined open position relative to the enclosure based upon the adjustable calibration, the sensor device is capable of providing sensor output.

According to a further aspect, the present disclosure provides a sensor device for sensing when a door of an enclosure is opened to a predetermined open position relative to the enclosure wherein the door is capable of being in a closed position and being opened to a more fully opened position beyond the predetermined open position, the sensor device configured to be calibrated comprising an arm wherein when the door opens, the arm slides against the door resulting in a switch event when the door is opened to the predetermined open position relative to the enclosure, the switch event resulting in sensor output, wherein the position of the arm relative to the enclosure is specifically adjustably calibrated to sense by sliding against the door when the door is at the predetermined open position relative to the enclosure, based upon the adjustable calibration.

According to a further aspect, the present disclosure provides a method automatically auditing the number of units within an enclosure having at least one door, comprising: receiving from a remote telemetry device data indicating the number of times within a predetermined period of time a door has been opened to a predetermined open position relative to the enclosure, the predetermined open position of the door being specifically calibrated by a sensor device being mechanically set when the sensor device is installed on the enclosure proximal to the door as a position of the door between a closed position and a more fully opened position beyond the predetermined open position, to generate a door opening count, wherein the remote telemetry device includes a sensor configured to be adjustably calibrated to sense when the door is at the predetermined open position relative to the enclosure based upon the adjustable calibration, to generate the door opening count.

According to a further aspect, the present disclosure provides a method for automatically auditing the number of items within an enclosure having at least one door for removal and restocking of the items, comprising: receiving from a remote telemetry device in communication with at least one sensor device configured to be calibrated, the calibration of the sensor device being set when the sensor device is installed based upon the size of an item, the sensor configured to detect the door opening to a calibrated door open position, data indicative of the number of items within the enclosure to determine a current count.

According to a further aspect, the present disclosure provides a method for automatically auditing the number of gas cylinders within an enclosure having at least one door for removal and restocking of the gas cylinders, comprising: receiving from a remote telemetry device in communication with at least one sensor configured to be calibrated based upon the size of a gas cylinder, the sensor configured to detect the door opening to a calibrated door open position, data indicative of the number of gas cylinders within the enclosure to determine a current count; and applying a characteristic correlation factor to the current count to generate a prediction of when units in the enclosure will reach a predetermined inventory.

According to a further aspect, the present disclosure provides a method for automatically auditing the number of items within an enclosure having at least one door for removal and restocking of items, comprising: receiving from a remote telemetry device in communication with at least one sensor configured to be calibrated based upon the size of an item to detect a door opening enough so that the item can pass through the door, the sensor configured to detect the door opening to a calibrated door open position, data indicative of the number of gas cylinders within the enclosure to determine a current count; and applying an historical correlation factor to correct the current count to generate a prediction of when units in the enclosure will reach a predetermined inventory.

According to a further aspect, the present disclosure provides a method for automatically auditing the number of items within an enclosure having at least one door for removal and restocking of items, comprising: receiving from a remote telemetry device in communication with at least one sensor configured to be calibrated based upon the size of an item to detect a door opening enough so that the item can pass through the door, the sensor configured to detect the door opening to a calibrated door open position, data indicative of the number of gas cylinders within the enclosure to determine a current count; and applying a characteristic correlation factor to the current count to generate a prediction of when units in the enclosure will reach a predetermined inventory.

Disclosed is a monitoring system for monitoring an enclosure's door opening events. A door of any type is connected to an enclosure wherein a door connection system, such as door hinges, is configured to allow a door to open and close. Disclosed is at least one sensor which is configured to detect when the door has been opened to a specifically calibrated position sufficient to allow the removal of the enclosed product between closed and fully open positions relative to the enclosure, the sensor providing sensor output. Also disclosed is an analyzing system configured to analyze the sensor output As mentioned, regarding enclosures, the present disclosure refers to self-service retail inventory management. The discussion below is with respect to a system and method for retrofitting an existing storage cage, particularly of the type that is used for the retail market for propane (LPG) cylinders (for example 9 kg) used in domestic barbeques. In another use case, for example, Forklift LPG cylinder cages are important in business-to-business operations where a warehouse/factory has multiple forklifts which need regular LPG cylinder swaps to fuel forklifts. In this instance, theft is not the concern, rather it is primarily continuity of supply that is important. However, any type of situation, enclosure and door are contemplated in the present description.

As mentioned, in the retail market for 9 kg propane (LPG) cylinders, retail outlets commonly house the gas cylinders in an outdoor storage cage with a locked door. Since the operator of the retail outlet generally is not responsible for monitoring or advising the gas cylinder supply business of the inventory level, the gas cylinder supply business would benefit from a retro-fit system providing an improved inventory monitoring capability. Readily available door counters that sense when a door is in an opened position and when it is in a closed position are not configured to detect when the door has been opened to a position specifically calibrated between the closed and fully opened positions to more reliably track when a specifically dimensioned product has been removed.

In situations as described above, it would be beneficial if sensor data provided output correlated to a specific calibrated opening position of a door. For example, particularly for enclosures that are outdoors, a door may have tendency to move due to wind or contact, therefore, commercially available door counters may provide false counts of relevant door openings. Enclosures may be built to low dimensional tolerances, allowing some free movement of doors even when secured in the "closed" position. Also, enclosures may be subject to various forms of in-service abuse, leading to doors which are bent or twisted.

Disclosed is a monitoring system and method for monitoring door opening events of an enclosure's door connection system being configured to allow the door to open to a predetermined open position relative to the enclosure wherein the door is capable of being opened beyond the predetermined open position, the monitoring system including at least one sensor device configured to be calibrated to sense when the door is at the predetermined open position relative to the enclosure so that the sensor device is configured to detect when the door has been opened to at least the predetermined open position relative to the enclosure, the sensor device providing sensor output.

Therefore, it is an object of the presently disclosed system for monitoring an enclosure's door opening events to at least ameliorate the above-described problems and to further provide a sensor device configured to be specifically calibrated to individual door opening events. In one embodiment, the calibration process can occur during a retro-fit installation process of the sensor device proximal to the enclosure. In another embodiment, the calibration process may occur in a factory installation process or be prefabricated to a specific calibration.

Disclosed is one or more monitoring systems and methods for monitoring an enclosure's door opening events. Disclosed is a sensor device is configured to be specifically calibrated to sense when the door is at the predetermined open position relative to the enclosure, the sensor device providing sensor output and a telemetry output system configured to transmit the sensor output.

Also disclosed is a sensor device that may include an arm wherein when the door opens, the arm slides against the door resulting a switch event when the door is opened to the predetermined open position relative to the enclosure, the switch event resulting in sensor output.

Also disclosed is a telemetry output system configured to transmit the sensor output. Additionally, disclosed is a monitoring system wherein the sensor output provides at least one of a count of when the door has been opened to at least the predetermined open position relative to the enclosure and a time stamp of when the door has been opened to at least the predetermined open position relative to the enclosure. Also disclosed is a monitoring system wherein the sensor output is provided at predetermined time intervals. Moreover, disclosed is a monitoring system wherein the sensor device comprises an arm such that when the door opens, the arm slides against the door resulting in a switch event when the door is opened to the predetermined open position relative to the enclosure, the switch event resulting in sensor output. Also disclosed is a monitoring system wherein the sensor device is configured to be calibrated during installation proximal to the enclosure by fixing the arm position relative to the enclosure. Furthermore, disclosed is a monitoring system of claim 1, wherein the sensor device provides image sensor output. Also disclosed is a monitoring system wherein the sensor device is configured to be calibrated during installation proximal to the enclosure. As well is disclosed a monitoring system wherein the sensor device comprises an arm and at least one housing member wherein during installation, the arm and the housing member are loosely bound prior to calibration, and then tightly bound upon calibration.

Disclosed is a method for automatically auditing the number of units within an enclosure having at least one door including receiving from a remote telemetry device data indicating the number of times within a predetermined period of time a door has been opened to a predetermined open position relative to the enclosure wherein the door is capable of being opened beyond the predetermined open position to generate a door opening count, wherein the remote telemetry device includes a sensor configured be calibrated to sense when the door is at the predetermined open position relative to the enclosure. Also disclosed is a method of receiving the number of units positioned within the enclosure at a prior particular time and determining from the data indicating the number of times within a predetermined period of time a door has been opened to a predetermined open position relative to the enclosure and the number of units positioned within the enclosure at a prior particular time, a current count. Additionally, disclosed is a method of claim of applying an historical correlation factor to the current count to generate a prediction of when units in the enclosure will reach a predetermined inventory. Furthermore, disclosed is a method of applying a characteristic correlation factor to the current count to generate a prediction of when units in the enclosure will reach a predetermined inventory number.

Disclosed is a method for automatically auditing the number of gas cylinders within an enclosure having at least one door for removal and restocking of the gas cylinders including receiving from a remote telemetry device in communication with at least one suitable sensor, data indicative of the number of gas cylinders within the enclosure to determine a current count and applying an historical correlation factor to correct the current count to generate a prediction of when units in the enclosure will reach a predetermined inventory. Also disclosed is a method of applying a characteristic correlation factor to the current count to generate a prediction of when gas cylinders in the enclosure will reach a predetermined inventory number.

Disclosed is a method for automatically auditing the number of gas cylinders within an enclosure having at least one door for removal and restocking of the gas cylinders, including receiving from a remote telemetry device in communication with at least one suitable sensor, data indicative of the number of gas cylinders within the enclosure to determine a current count and applying a characteristic correlation factor to the current count to generate a prediction of when units in the enclosure will reach a predetermined inventory. Also disclosed is a method of applying an historical correlation factor to the current count to generate a prediction of when gas cylinders in the enclosure will reach a predetermined inventory number.

The instant disclosure is provided to explain in an enabling fashion the best modes of making and using various embodiments. The disclosure is further offered to enhance an understanding and appreciation for the embodiments principles and advantages thereof, rather than to limit in any manner the scope of the claims. While the embodiments are illustrated and described here, it is clear that the scope of the claims is not so limited. Numerous modifications, changes, variations, substitutions, and equivalents will occur to those skilled in the art having the benefit of this disclosure without departing from the spirit and scope of the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present embodiments, discussion of such software and ICs, if any, is limited to the essentials with respect to the principles and concepts within the embodiments.

DETAILED DESCRIPTION OF THE EMBODIMENTS

Figure 1:
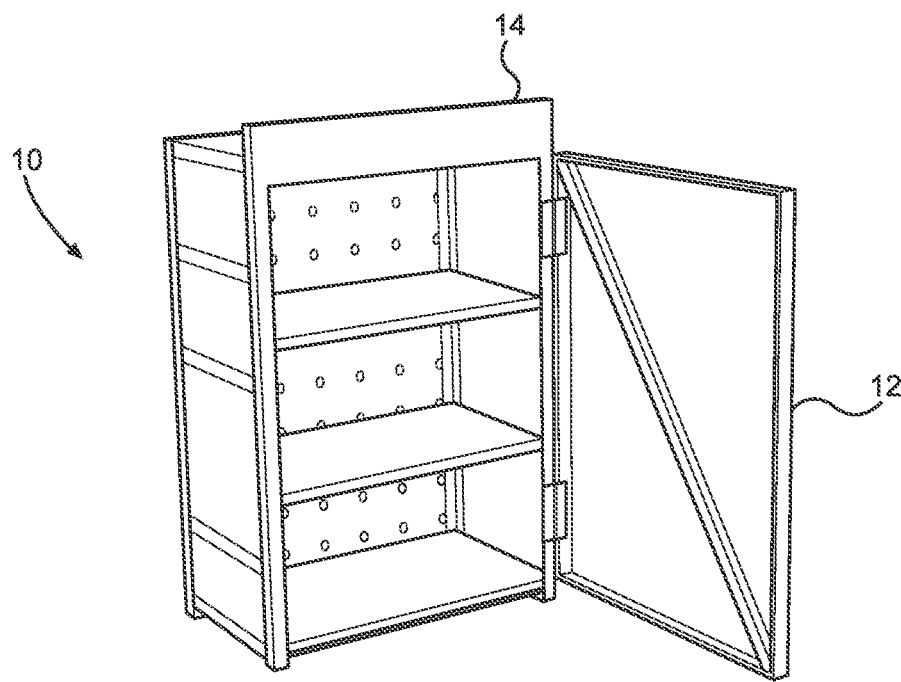
FIG. 1 depicts a gas cylinder cage including a hinged door connected to an enclosure.

Disclosed is a monitoring system for monitoring an enclosure's specifically calibrated door opening events. As mentioned above, while this description uses a gas cylinder cage as an example enclosure 14, there is no intention to limit enclosures of this disclosure to only gas cylinder cages. In FIG. 1, the door 12 of the gas cylinder cage 10 is shown as a hinged door. While this description uses a gas cylinder cage hinged door as an example door, there is no intention to limit doors of this disclosure to hinged doors. For example, roller doors, sliding doors, folding doors, as well as any other door type having a variable opening capability can be configured with a disclosed sensor device which provides the ability to sense the door opening to a specifically calibrated predetermined open position relative to the enclosure. Shown in FIG. 1 is an angle iron front panel configuration for supporting hinges but any enclosure/door configuration is within the scope of this discussion.

Figure 2:
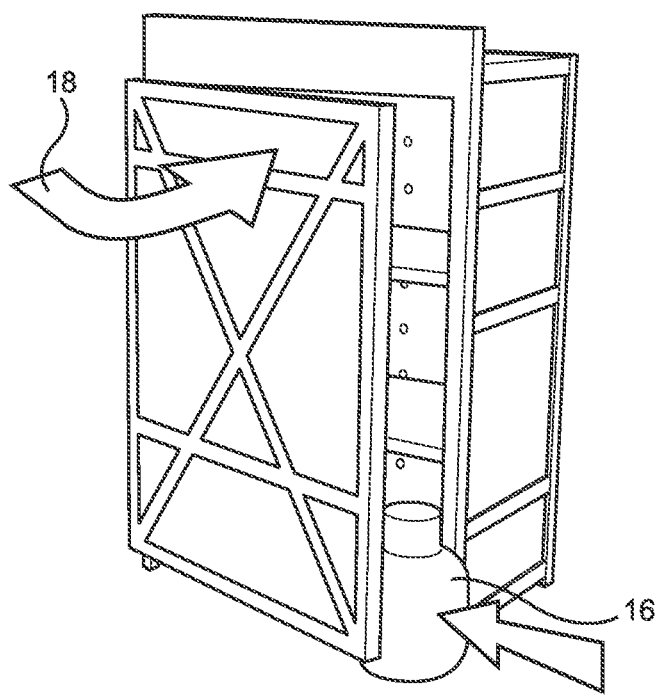
FIG. 2 depicts an item, in this case, a gas cylinder which is positioned between the door and the enclosure for example, for the purpose of calibration.

FIG. 2 depicts an item, in this case, a gas cylinder 16 which is positioned between the door 12 and the enclosure 14, for example, for the purpose of calibration. Shown, is the door 12 having been moved in a direction 18 so that it would otherwise be in a closed position were it not for the gas cylinder 16 in between the door 12 and the enclosure 14. In a situation such as where there is unsupervised access to the contents of an enclosure, sensing and reporting if and/or when the door has been opened enough to allow a cylinder 16 to be removed from the enclosure 14 may provide relevant sensor data. Depending upon the enclosure and the items stored therein, in this example, gas cylinders, or in another example, a bag of ice, specific calibration upon installation may allow the disclosed sensor device to sense when the door has been opened just enough to allow an item stored therein to be removed.

Figure 3:
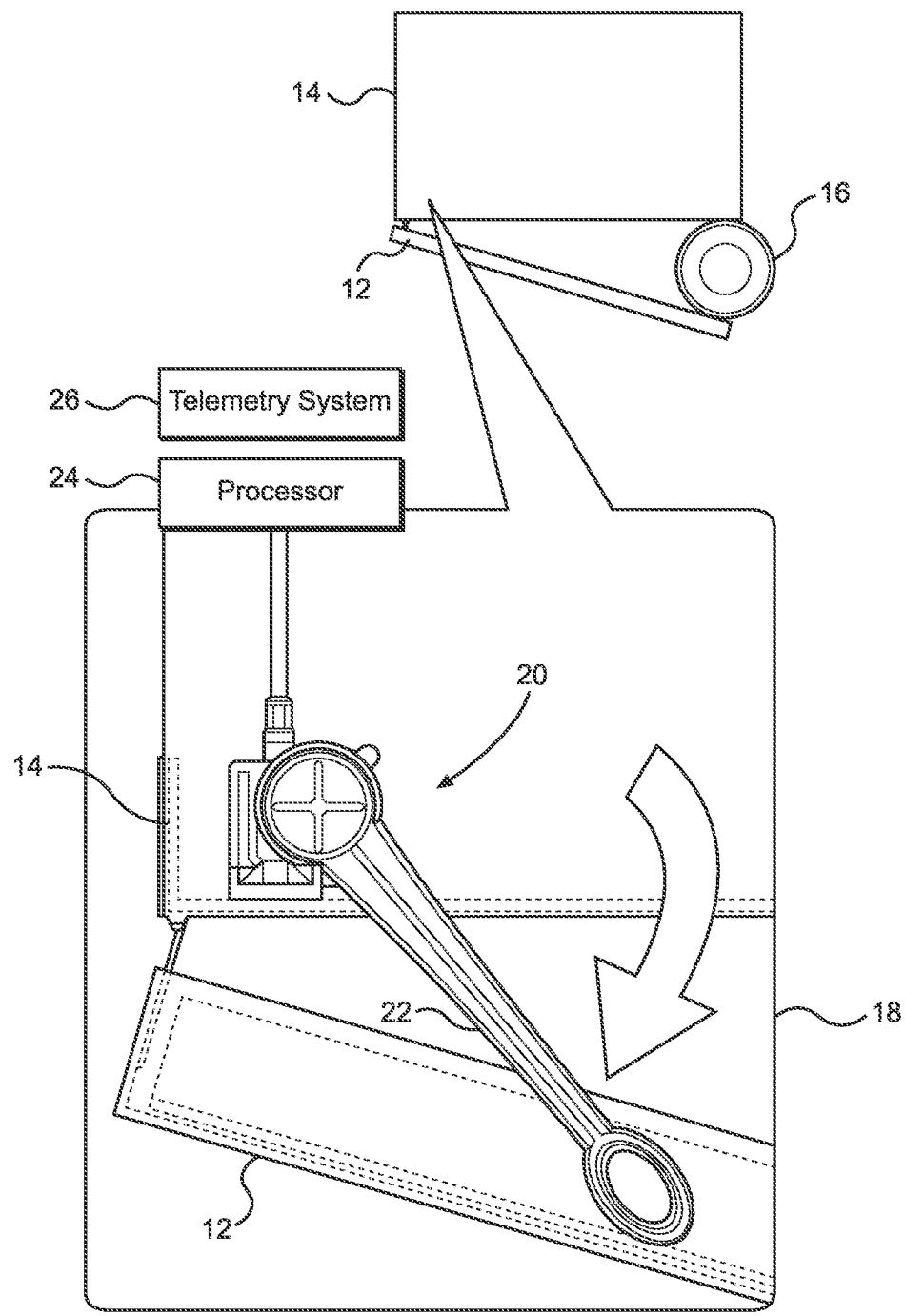
FIG. 3 shows a top down view of cylinder 16 in a position between the door 12 and the enclosure 14 of FIG. 2.

A top down view of cylinder 16 in a position between the door 12 and the enclosure 14 of FIG. 2 is shown FIG. 3. In this embodiment, the door is therefore in a desirable position for sensing when the door 12 is at the predetermined open position relative to the enclosure 14. More particularly, a gas cylinder 16 would not be able to be moved out of the enclosure 14 if the door 12 were not opened to at least the shown predetermined open position relative to the enclosure 14. The door 12 is still capable of being opened beyond the predetermined open position, but at a minimum, the door 12 is opened such that a gas cylinder 16 may be removed or added to the gas cylinder cage 10. Most likely, the size of an item would be used by a user of the disclosed systems and methods for calibrating the predetermined open position of the door 12, but not necessarily. Any calibration at any predetermined open position of the door 12 is within the scope of this discussion.

FIG. 3 further depicts in an inset 18, an embodiment of the disclosed systems and methods. In this embodiment, a sensor device 20 is placed near where the door 12 meets the enclosure 14. In this embodiment, an arm 22, for example spring-loaded, of the sensor device 20 slides against or along the door 12 resulting in a switch event when the door 12 is opened to the predetermined open position relative to the enclosure 14, the switch event resulting in sensor output. In this illustrated embodiment, the switch is mechanical, not requiring power. In this embodiment, a processor 24, for example, may be incorporated into a telemetry output system 26. It is understood that some or all of the features described herein or otherwise may be incorporated into one or more housings. For example, all of the features or elements described herein may be housed in a single housing. Other alternatives, such as the telemetry output system 26 may be housed in a housing separate from the sensor device 20. The sensor output may be received by the processor 24 and transmitted by the telemetry output system 26 configured to transmit the sensor output. Power required for the processor 24 and the transmitter or transceiver of the telemetry output system 26 may be provided by a battery (not shown). A battery plus a capacitive element for storing power for data bursts may be incorporated into the telemetry device. One or the other, or a combination of transmission scheduling and compression of data by the telemetry device may conserve power of the telemetry output system 26. The sensor data from the cage sensor device 20 and transmitting the data via the telemetry output system 26 to a remote location maybe used, for example, by an inventory management and distribution system.

In one embodiment, the telemetry output system 26 may transmit data via a cellular mobile network or an Internet of Things (IoT) network. However, many other telemetry techniques can be used to transmit and receive data, for example, fixed telephone or internet line (copper, fiber), LP-WAN (public and/or private), private radio link e.g. ISM band, Wi-Fi or satellite communications. Optionally, a disclosed sensor device 20 can be arranged to transmit to a nearby transceiver which is capable of transmitting to a network. For example, the transmission between sensor device 20 and a transmitter can be through a cable or private radio link, and the transmission to the network can be via a cellular network, LP-WAN or fixed telephone or internet line. If two-way transmission is enabled, data may be received for example, to update software/firmware of the processor 24. The sensor output may be manipulated or compressed by the processor 24 for efficient use of energy in transmission.

In another embodiment, the use of a switch 46 (or other means for receiving or providing sensor output) as described below together with a locally mounted totalizer may provide sensor output that could be read by a person for subsequent data entry and processing. A manual inspection of a counter device may provide information to an observer of a count, for example, of the number of times that the door is opened to the specifically calibrated opened position.

Figure 4:
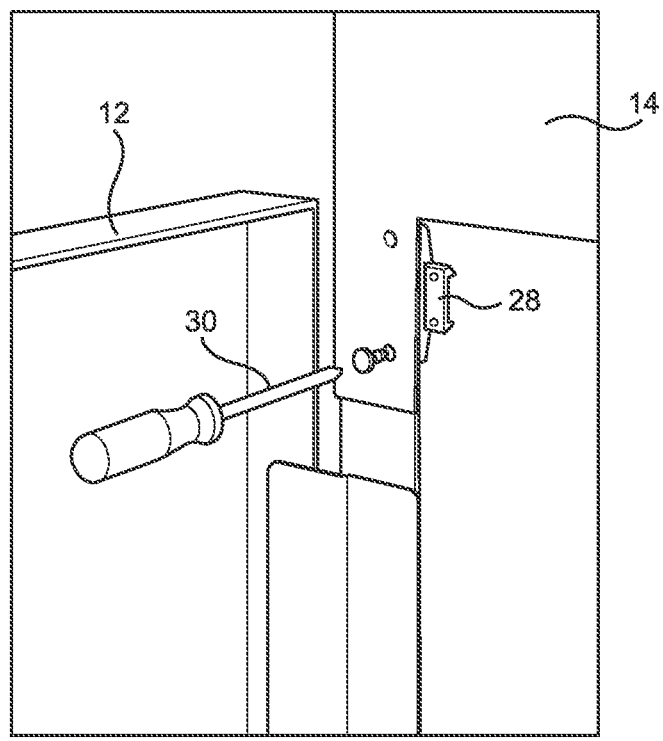
FIG. 4 depicts an installed bracket.

FIG. 4 depicts a disclosed system which can be retrofitted to existing gas bottle cages or any type of enclosure with a door by attaching the disclosed sensor device system to an attached bracket. A bracket 28 may be removably attached to the enclosure 14 with for example a screw and a screw driver 30, or with a hammer and nail, or not attached but positioned. It is understood that any manner in which to install an embodiment of the disclosed systems and methods to an enclosure of any type is within the scope of this discussion.

Figure 5:
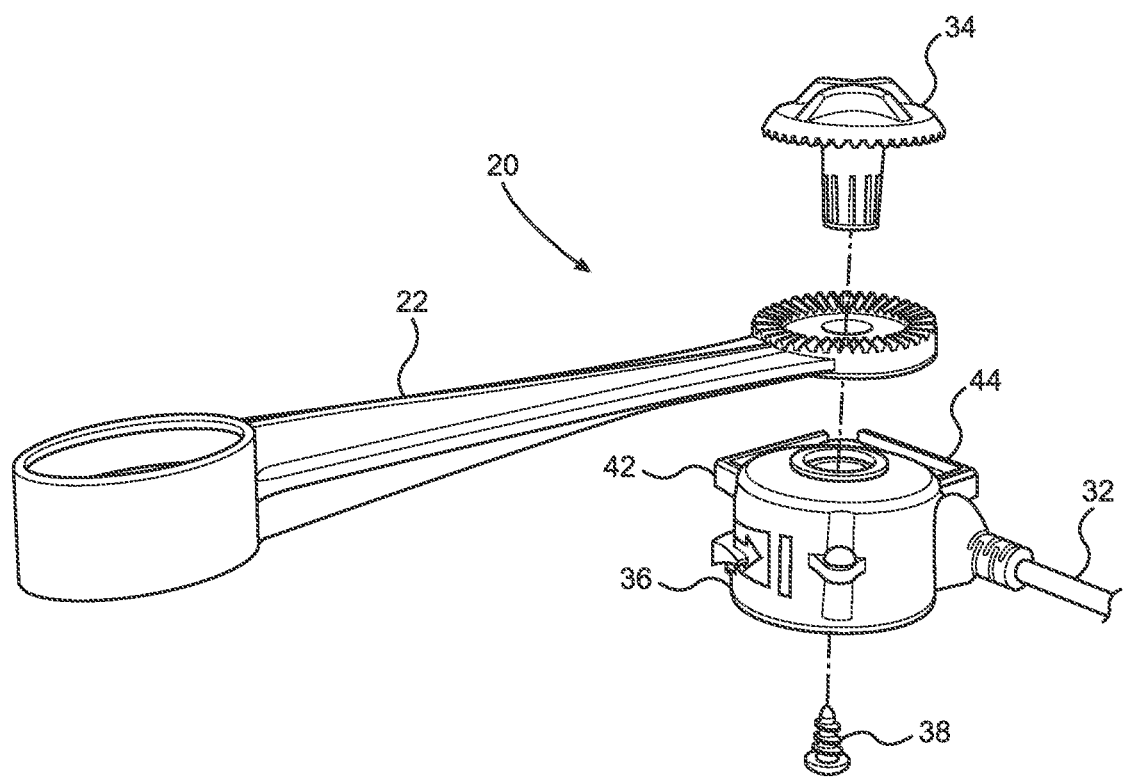
FIG. 5 depicts an expanded view of an embodiment of the disclosed sensor device.

FIG. 5 depicts an expanded view of an embodiment of the disclosed sensor device. The disclosed sensor device 20 may be packaged in disassembled parts as shown in FIG. 5. A processor, transmitter and battery as shown in FIG. 3 may come with one or more sensor devices 20 since an enclosure may include more than one door.

In one embodiment, at least one housing member, or more than one housing members, for example, a top cover 34 and a bottom housing 36 may be aligned with the arm 22 by a user so that a fastening device such as a screw 38 may loosely bind them together. In one embodiment, the tightening of the screw 38 may be incomplete, leaving a gap 40 shown in FIG. 6. At this point, the pictured sensor device 20 may be held together, but it is not in a completely assembled state. The pictured sensor device 20 may then be attached to a bracket 28, such as that shown in FIG. 4. Depending upon how the door 12 is opened, to the right, or to the left, either one of flanges 42 or 44 may be used to hold the sensor device 20 in place on a bracket 28. Also, depending upon the orientation of the device, the different parts may be aligned in a different order than that shown.

Figure 6:
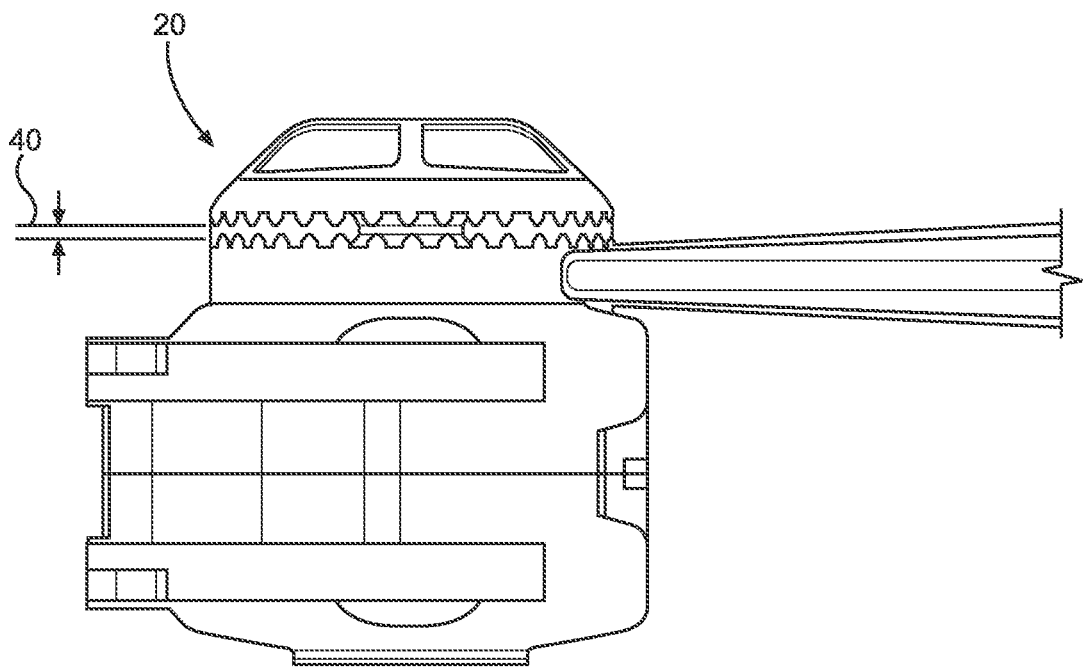
FIG. 6 depicts a sensor device prior to calibration.
Figure 7:
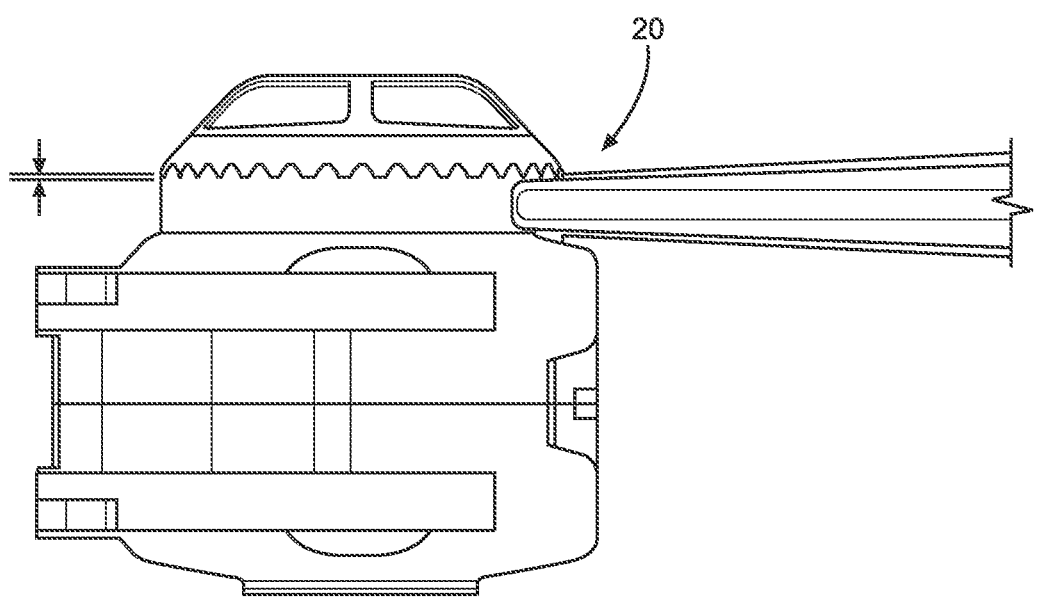
FIG. 7 depicts a sensor device after calibration.

At the point of installation depicted in FIG. 3, an item 16 may be placed between the door 12 and the enclosure 14. The arm 22 can therefore be moved so that it aligns with the position of the door 12. The arm is thus configured to be at the specifically calibrated predetermined open position relative to the enclosure. The door may also be opened farther than the predetermined open position. Accordingly, the door then may be opened farther allowing a user access to screw 38 so it may be tightened so that the gap 40 shown in the sensor device of FIG. 6 is closed as shown in FIG. 7.

Figure 8:
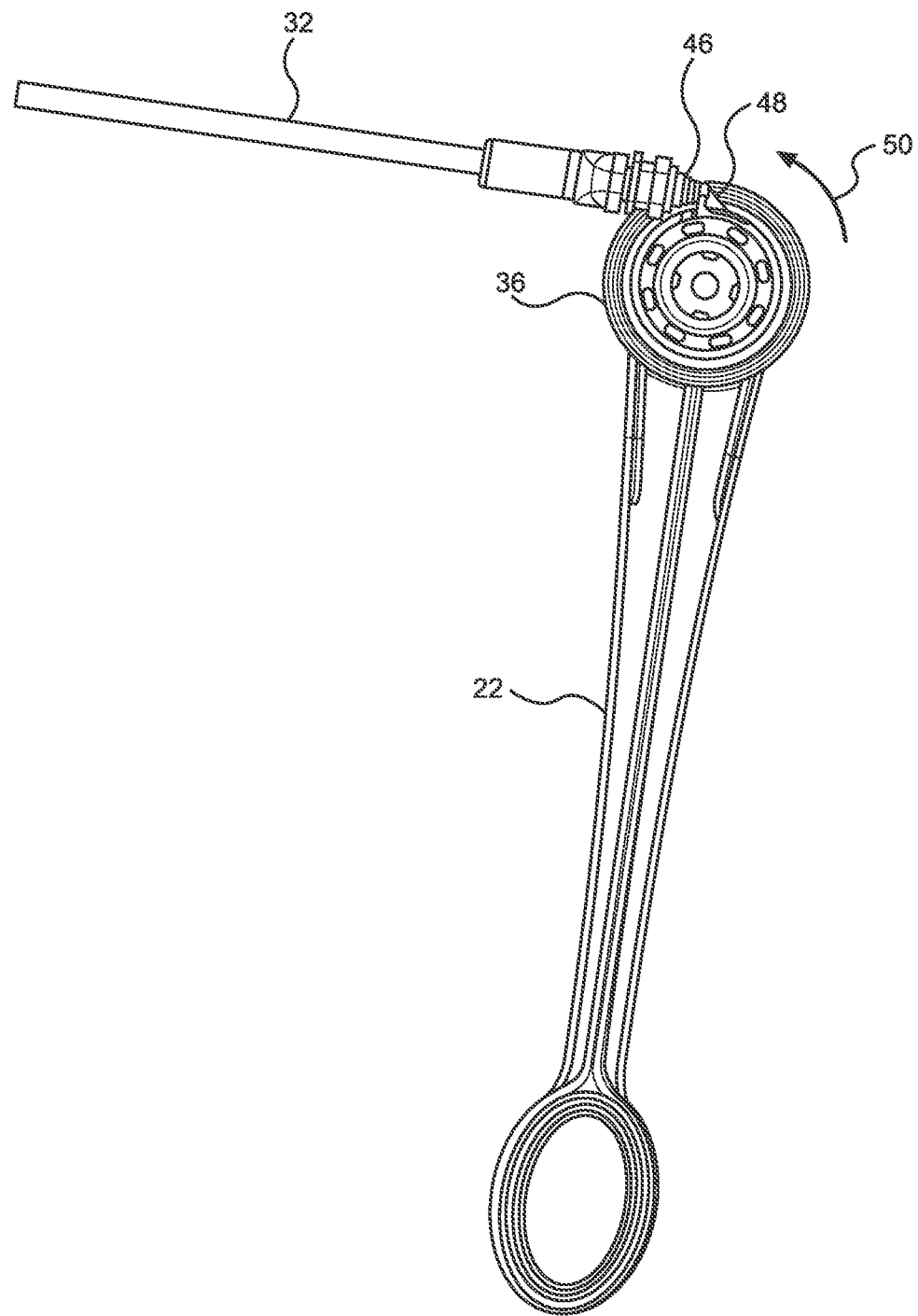
FIG. 8 depicts a switch of a sensor device that may provide sensor output of an embodiment of a sensor device.

FIG. 8 depicts an embodiment for a switch mechanism of the sensor device 20 for providing sensor output. As described above, any type of sensor may be utilized as a sensor device 20, and therefore the manner in which to capture switch events may be dependent upon the type of sensor utilized. In the illustrated embodiment, an arm 22 of a sensor device 20 may move along a door 12 as it opens so that the arm 22 slides against the door 12 as described above. Once the door reaches the predetermined open position set by the calibration process described above, a switch 46 event may occur when the door 12 is opened to the predetermined open position relative to the enclosure 14. The switch event results in sensor output provided to the processor 24 and/or the telemetry output system 26.

Still referring to FIG. 8, a switch event may be triggered when an axle 36 including a tab 48 moves in direction 50 when the arm 22 moves while the door 12 is opening. During the calibration process, the axle 36 had been adjusted so when the tab 48 reaches the switch 46, the door 12 and therefore the arm 22 are at the predetermined open position relative to the enclosure 14, resulting in a switch event. A tactile/physical feedback when the door is opened to predetermined open position may be provided or not provided.

Validating a door opening event as significant so that interpretation of the door opening event data is accurate is within the scope of this discussion. For example, factoring a margin of error may improve accuracy. Other validating features may include collecting data indicative of the time spent that the door stays open at or past the predetermined open position. For example, a switch event may occur when the door is closed and passes the specifically calibrated door opening position. Alternatively, a different switch may monitor door closing events at a different point than the specifically calibrated door opening position. In this manner, the time spent while the door is open at or beyond the specifically calibrated open position may be captured. The time that the door is open may be indicative of the number of items removed or added to the enclosure. For example, if the time spent open at the specifically calibrated open position is between 10-20 seconds, that may indicate that one item was being removed during that time. If the time that the door is open is 3 minutes, that may indicate that the enclosure has been restocked. Such data may be transmitted from the telemetry output system 26 and received remotely for example, at a remote server, for example, not waiting for a regular periodic reporting time but substantially immediately when there is a substantial deviation from the normal time that is spent with the door open at or beyond the specifically calibrated. When there is a substantial deviation from the time normally spent with the door open at or beyond the specifically calibrated, that time may be compared with a distributor's records which may be stored, for example, at remote server, to determine if in fact the data correlates with a delivery. If the data is substantially outside predicted data (which is described below), there may be an indication, for example, that the door was left open accidentally, or that there has been a theft It is understood that the embodiment of the sensor device 20 described above is one manner in which to carry out the disclosed systems and methods. Another method may include utilizing image capture and calibrating the image capture system to generate suitable sensor output when the door 12 is at the predetermined open position relative to the enclosure 14 (see FIGS. 2 and 3). For example, with a camera of any suitable type positioned appropriately can capture removal from or stocking of gas cylinders into a gas cage enclosure. To extend a camera's battery life, for example, a motion sensor can sense motion near a gas cylinder cage. The motion sensor may initiate the camera to wake up so that it can capture removal or stocking of gas cylinders. In a similar fashion to the described partial door opening sensor, a calibration image may be stored. That is, while the camera is in its position to capture removal or stocking of gas cylinders, a calibration image may be specifically captured of a gas cylinder being removed or being stocked in the gas cylinder cage. That calibration image may be, for example, stored locally or remotely. The camera may be in communication with a local or remote processor that can compare a captured image with the calibration image to filter the camera captured data to better assure that data output delivered by the camera as to removal or stocking of gas cylinders is more reliable than it would be without a comparison step.

Some other alternative methods of determining door opening which may be calibrated to sense opening at a predetermined door opening position include, for example: a magnetic reed switch: place the magnet on an adjustable element (e.g. the arm) to allow set point variation; a magnetic reed switch: use a reed switch/magnet pair in place of the current micro-switch and activation element in the axle moulding; a capacitive sensing device: capacitance varies with distance so a plate that moves as the door opens can be used; a capacitive sensing device: capacitance varies with element size so an appropriate encoder disc can be used to calculate angular movement; an inductive sensing device: techniques like linear variable differential transformers, variable inductance measurement; a resistive sensing device: a potentiometer could be driven by the arm and the position determined; an optical sensing device: any of numerous forms of encoder disc could be used to provide either binary (open/closed) or rotational position detection. With the exception of the reed switch implementation, others described may require powering of the sensing element or device whether the switch is open or closed; i.e. the sensor dissipates power continually (or else, to conserve power, the controlling device needs to duty-cycle the power to the sensor i.e. monitor the door periodically, e.g. every 10 seconds). Any other manner in which to carry out the disclosed systems and methods is within the scope of this discussion.

The present disclosure includes systems and methods for tracking inventory levels in an enclosure as a function of time. The system includes a sensor device for detecting each time the cage door is opened just wide enough to pass a particular sized item through it, a telemetry output system 26 for receiving door opening data from the sensor device 20 and transmitting it to a remote location, a re-stocking data collection system for collecting re-stocking data about re-stocking events at the enclosure, a computer processor for receiving the door opening data and the re-stocking data and calculating historical item inventory levels in the enclosure as a function of time.

Up until this point, this disclosure has mostly described a particular sensor capable of calibration to a partial door opening. It is understood that treatment of data output is independent of the manner in which the data was generated. That is, any suitable sensor or sensors for determining the number of cylinders in an enclosure is within the scope of this discussion as it relates to FIGS. 9-12. Different methods were discussed above, and any suitable method or system of determining the number of units in an enclosure is within the scope of this discussion for making a prediction of the number of units in an enclosure at a later time.

Figure 9:
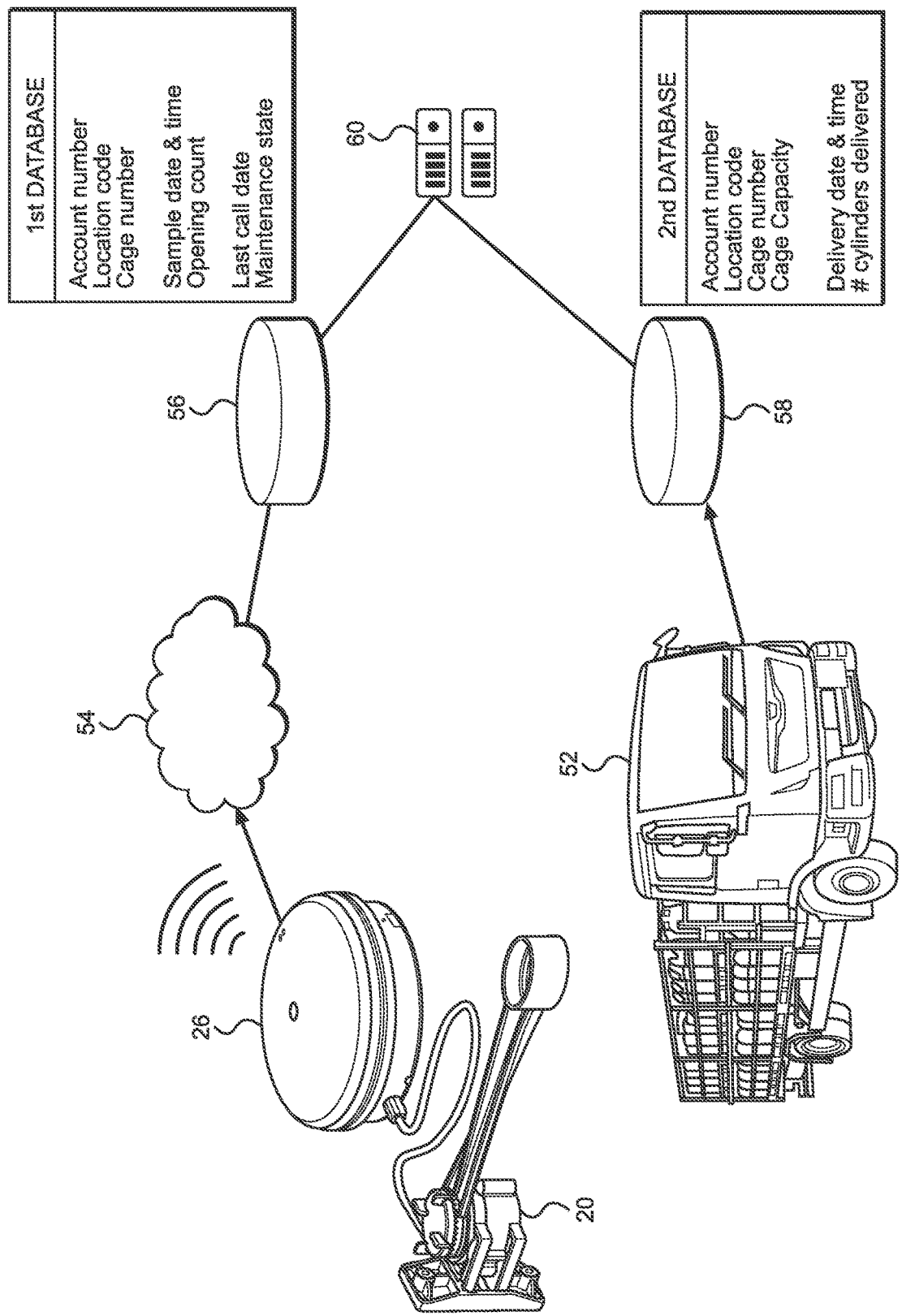
FIG. 9 depicts a system incorporating a sensor device into a distribution system.

FIG. 9 illustrates an embodiment of a distribution system incorporating the sensor unit 20 which may include the function of analysis of the sensor 20 output. The re-stocking data collection system may involve each delivery driver 52 inputting data on, for example, their mobile devices, about their item deliveries, such as, the date and time of delivery, the quantity of items delivered to the enclosure, the quantity of items removed from the enclosure, the number of times the enclosure was opened (usually once only) as part of the re-stocking process. This data may enable the processor, local or remote, to reconcile the door opening data with the actual number of items delivered. The reconciliation may be useful because each door opening does not always correlate with removal or stocking of an item. There may be multiple removals of items per door opening, or there may be multiple door openings per removal of items.

The processor 24 and/or one or more other processors, for example, of a server 60 receiving data from for example the Cloud 54 and/or a database 56 and/or database 58, or any suitable combinations of network configurations may also estimate the inventory in real time based on a calculated historical correlation between the number of door openings to the specifically calibrated position and actual number of items delivered. For example, the processor may calculate an historical correlation of $C=f_D$, where C is the actual number of items delivered, D is the number of partial door openings to the calibrated position measured by a disclosed sensor device 20, and f is a historical correlation factor for an enclosure. For example, if f=1.05, an average of 1.05 items are actually removed for every door opening. When partial door opening to the calibrated position data is received by the processor, the processor may use the value off to estimate the number of items that have been removed up to that point in time from the prior inventory which may be calculated or empirically determined according to a recorded prior restocking event.

The processor may update the value off over time by using a rolling average of data for C and D, for example a rolling average over a period of time (e.g. over the last 4 weeks) or over a fixed number of items delivered (e.g. over the last 500 items delivered to an enclosure).

The processor may also maintain one or multiple $f_C$ historical or predictive characteristic correlation factor values reflecting variables including, for example, the season of year and or annual event such as a public holiday e.g. Thanksgiving, summer, day of the week, time of day, etc. The characteristic correlation factor may be pre-characterized utilizing historical trends wherein one or more predetermined set of characteristic values can be stored and accessed depending upon the season, holiday events and the time of day for a particular geographic area, and/or even as granular as for a particular enclosure once analyzed. Also, one or multiple $f_C$ values may be predictive.

The telemetry output system 26 may be arranged to report data in response to one or more triggers or switch events. An example of a trigger is the time elapsed since the last report was sent e.g. report data every one hour, six hours, 12 hours, or 24 hours. Another example of a trigger is the time of day e.g. report data at 6 am, 12 pm and 6 pm. Another example of a trigger is when the number of door openings since the last re-stocking event reaches a pre-set number. There can be multiple pre-set numbers e.g. 15 and 20 items. The pre-set number can be set for each cage. For example, for a cage with a capacity of 21 items, the pre-set number may be 7, which means the telemetry output system 26 may report data when the inventory is estimated to be 33% of capacity. This type of trigger has a number of advantages over a fixed reporting schedule. For example, it may reduce the number of times at which the telemetry unit reports data, which saves battery power and telecommunication costs. Also, it reports data in the event there are an unexpectedly large number of removals between scheduled reporting times. The telemetry output system 26 can include both multiple triggers. For example, it can report at scheduled times (e.g. 12 pm every day) plus whenever the number of door openings to the specifically calibrated position since the last restocking event reaches a pre-set number.

The disclosed systems and methods may collect data from a sensor device 20 and use a dialer or telemetry output system 26 to transmit the data wirelessly via the cloud or otherwise to a database 56 of FIG. 9. The data, for example, may include, account number, location code, enclosure number, sample date and time, opening count, last call date and maintenance state.

Delivery units may also record and report data, for example, account number, location code, enclosure number, enclosure capacity, delivery date and time, number of items delivered and number of times the door 12 was opened to the specifically calibrated door opening position or a fully opened position for refreshing. The delivery unit's data may be entered into a different database than that of the sensor device 20, or the same database. If entered into different databases, for example database 58, one or more servers 60 running delivery management software processes data from more than one database calculates historical item inventory levels in the enclosure as a function of time, as well as a live estimate of the current item inventory.

There are several technical benefits of the disclosed sensor device. First, its operating power requirements are minimal, particularly in the case of a mechanical switch. Another is the ease of retro-fitting an existing enclosure with the device. Another benefit is that the disclosed sensor device 20 has limited/minimal manufacturing requirements. Also, the sensor device is versatile, wherein it is useful for a variety of enclosure door configurations. Other configurations may also provide technical benefits As illustrated in FIG. 9, a server 60 may receive data from, for example, the Cloud 54 and/or a database 56 and/or database 58, or any suitable combination of network configurations and may carry out a method for automatically auditing the number of units within an enclosure having at least one door. The method can include the server 60 being configured to receive from a remote telemetry device 20 data indicating the number of times within a predetermined period of time a door has been opened to a predetermined open position relative to the enclosure to generate a door opening count wherein the door is capable of being opened beyond the predetermined open position. The disclosed remote telemetry device can include a sensor configured be calibrated to sense when the door is at the predetermined open position relative to the enclosure.

Receiving available unit data can include receiving data of prior distribution event and calculating the current number of units by utilizing the door opening events. Also contemplated is receiving from a remote telemetry device including at least one sensor, data indicative of the number of gas cylinders within the enclosure to determine a resultant current count. Also contemplated is receiving from a remote telemetry device including at least one sensor, data indicative of the number of units of any type of inventory. Above, different types of sensing methods were discussed, wherein it is understood that any type of sensor is included in this discussion.

Figure 10:
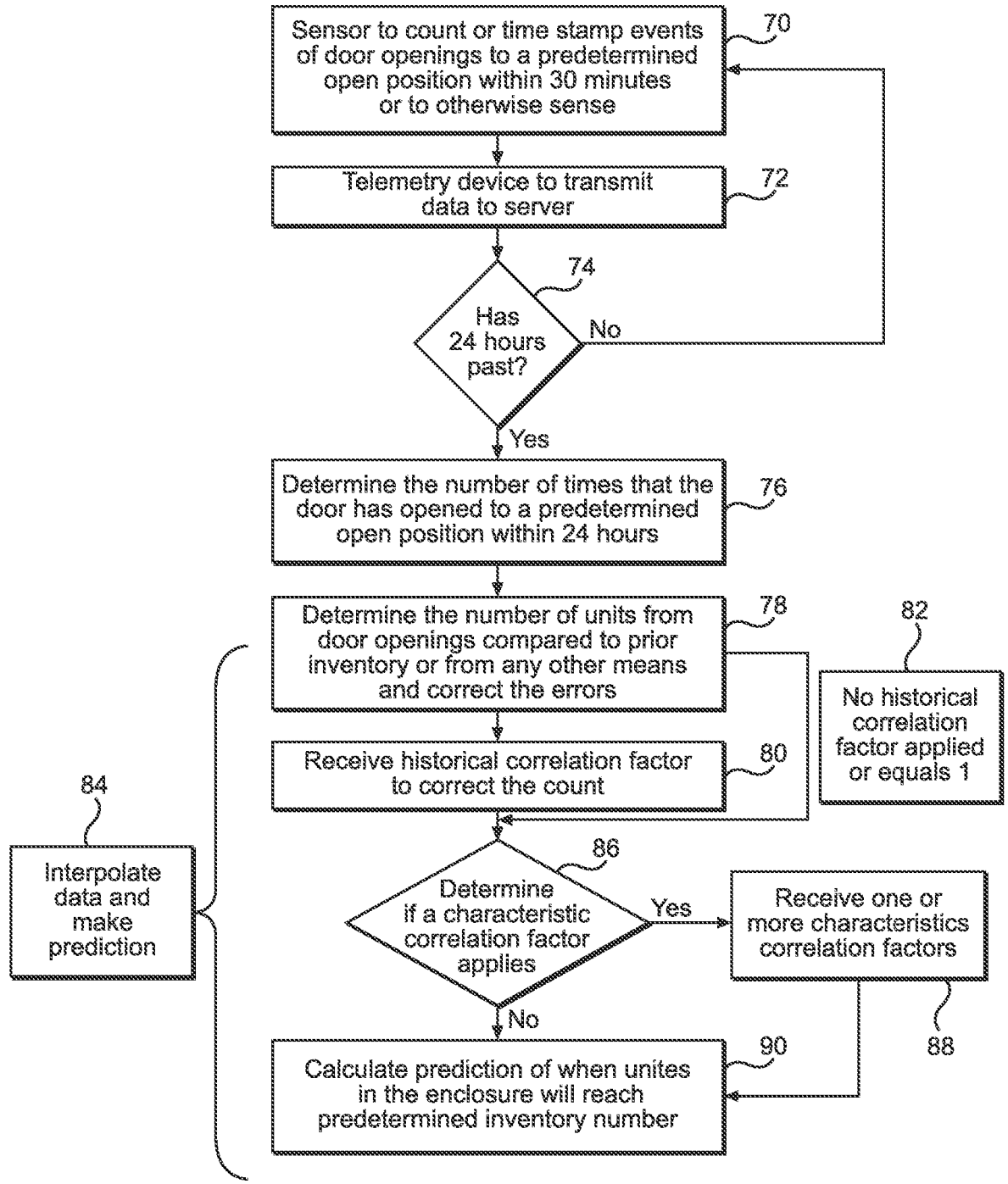
FIG. 10 depicts a flow chart illustrating one or more disclosed methods of predicting the count of gas cylinders in an enclosure.
Figure 11:
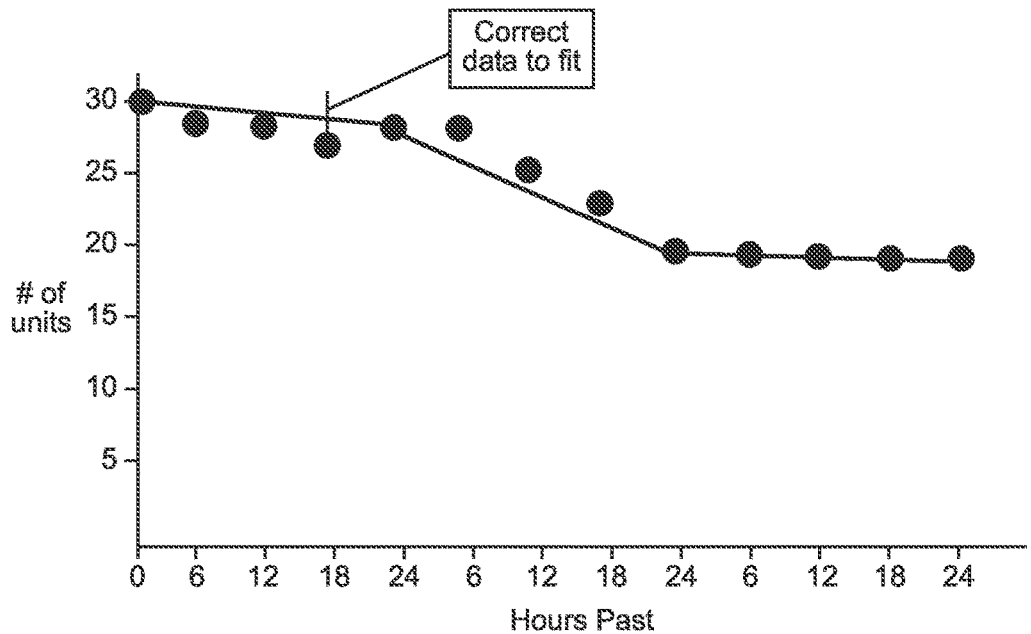
FIG. 11 is a graph illustrating hours on the x-axis and the number of units on the y-axis.

Referring to FIG. 10, a method of calculating a prediction of when units in an enclosure will reach a predetermined inventory number is depicted. FIG. 11 refers to a prediction curve which could be generated by one or more disclosed methods. In this way, a distributor of inventory units can rely on a prediction for determining delivery timetables and routes. The benefits may include at least that enclosures may not run out of inventory while there is still demand for the inventory and that the distributor may not waste resources by refilling the enclosure before it is necessary to do so. Therefore, resources may not be wasted by either users of the inventory making a trip to obtain inventory units when the stock has been depleted, or by the distribution system making a trip to the enclosure before there is a need to restock it.

FIG. 10 depicts a step 70 including that at least one sensor determines the number of times within a predetermined period of time a door has been opened to a predetermined open position relative to the enclosure, for example, by counting or time stamping door opening events. For example, a time period of thirty minutes may be used as an interval for which a telemetry device in communication with at least one sensor of the enclosure to transmit data to a remote server, at step 72. To save energy, an option can include programming the telemetry device to transmit during hours in which there are transactions, as for example, during business hours. Other times, when the enclosure may not be accessible, the processor may be programmed to avoid sending updates.

At the server, data may be received from the telemetry device indicating door opening events. It may be determined that the data should be analyzed at intervals of twenty-four hours at step 74. Any other suitable time may be used to collate the data received from the telemetry device 20 at step 76. In this manner, the method includes at step 78 determining the number of units from door opening events compared to prior inventory or from any other means. For example, the method for auditing the number of gas cylinders within an enclosure can include receiving from a remote telemetry device 20 which includes at least one sensor of any suitable type, data indicative of the number of gas cylinders within the enclosure to determine the resultant current count. In either manner of determining the number of items in the enclosure, correction algorithms can be applied to the data, as is illustrated in FIG. 11 below. In step 78, error correction may be accomplished by error detection and including any standard means available.

As discussed above, an historical correlation factor f may be received by a computing server at step 80. A database may store historical correlation factors f locally or remotely, or they may be accessed, for example, via the Internet. An historical correlation factor f may be applied to the value or values obtained at step 78. Also, there may be situations in which the historical correlation factor f will not be applied, or may be equal to 1, for example at step 82. As shown in FIG. 10 item 84, data interpolation is used to make a prediction for calculating when the number of units within the enclosure will be reduced to a predetermined number of units. Accordingly, at this point it may not be necessary to utilize a character correlation factor $f_c$ in step 86, and base the prediction upon only either the raw data of step 76, or the data after an historical correlation factor f has been applied and/or after a character correlation factor $f_c$ has been applied. Alternatively, one or more characteristic correlation factors fc may be applied at step 88.

With a prediction as to the when the number of units within the enclosure will be reduced to a predetermined number of units at step 90, at least two benefits may occur. First, a distributor will be less likely to make trips to fill the enclosure until the number of units in the enclosure reaches an optimized number. Second, the distributor may be less likely to run out of units in the enclosure because the prediction will allow the distributor to better estimate when the enclosure will run out of units, and therefore, the distributor can plan a trip to fill the enclosure before its inventory runs out.

Figure 12:
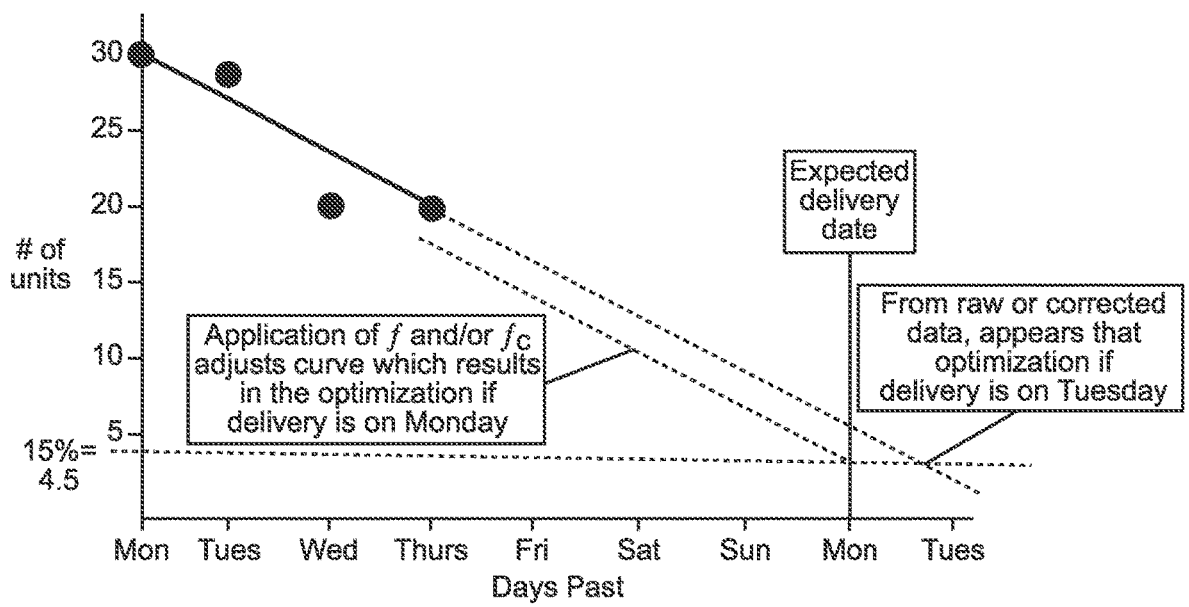
FIG. 12 is a graph depicting a prediction made with the application off and/or $f_c$.

Turning to FIGS. 11 and 12, depicted is the usage in raw data and corrected data over three twenty-four hour periods. The number of units present in the enclosure is known to be 30 units at zero hours (which is the equivalent of 24 hours further down the scale). As is shown, over the first twenty-four hour period, the dots indicated the raw data, wherein there is an anomaly in one data point that is corrected using standard correction methods. As mentioned previously with respect to FIG. 10, the data can be sampled over any time intervals. The selection of six hour time periods is for illustrative purposes. One or more curves can be fitted to the data, which in this example, includes three consecutive days.

Referring to FIG. 12, the ending balances of the three twenty-four hour period intervals shown in FIG. 11 is mapped. In one exemplary scenario, a distributor may determine that it is optimal to make a delivery to an enclosure when the 85% of the inventory originally available in the enclosure has been removed, which means that 15% of the inventory is still available. A curve is fitted to those data points and provides a trajectory from the original fill day of Monday, and is depicted by a dotted line. From the raw and/or corrected data, it appears that optimization would occur on the Tuesday, a week later. However, when correcting the trajectory by the application of either or both of the historical correlation factor f and the characteristic correlation factor fc, the curve is adjusted whereby the resultant curve intersects the optimal 15% target for deliveries.

The historical correlation factor f as mentioned above can take into account the behavior of inventory in previous weeks, for example, with respect to the geographical area, and even as granular as the specific enclosures. The characterization correlation factor $f_C$ might take into consideration, for example, weather conditions, seasons, approaching holidays, and special offers that bring in customers to the establishment.

The disclosed method is for automatically auditing the number of units within an enclosure having at least one door and at least one sensor for reliably tracking the inventory within an enclosure. Disclosed above is a device and method for determining when a door has been opened to a predetermined open position. Other methods involving at least one sensor for reliably tracking the inventory within an enclosure were discussed above. The data transmissions received via remote telemetry device transmissions can be corrected and subjected to manipulation including, but not limited to the application of a historical correlation factor f and a characterization correlation factor $f_C$. In this manner, audit may provide predictions as to inventory depletion so that distributors can better plan for distribution, with the goal of better optimizing resources. This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the appended claims, as may be amended during the pendency of this application for patent, and all equivalents thereof, when interpreted in accordance with the breadth to which they are fairly, legally and equitably entitled.

What is claimed is:

1. A method to automatically audit the number of units within an enclosure having at least one door, comprising:
    receiving from a remote telemetry device data indicating the number of times within a predetermined period of time a door has been opened to a predetermined open position relative to the enclosure, the predetermined open position of the door being specifically calibrated by a sensor device being mechanically set when the sensor device is installed on the enclosure proximal to the door as a position of the door between a closed position and a more fully opened position beyond the predetermined open position, to generate a door opening count, wherein the remote telemetry device includes a sensor configured to be adjustably calibrated to sense when the door is at the predetermined open position relative to the enclosure based upon the adjustable calibration, to generate the door opening count;
    receiving a number of the units positioned within the enclosure at a prior particular time; and
    determining a current count of the units based on the data indicating the number of times within a predetermined period of time a door has been opened to a predetermined open position relative to the enclosure and the number of units positioned within the enclosure at a prior particular time.

2. The method as claimed in claim 1, further comprising:
    applying an historical correlation factor to the current count to generate a prediction of when the units in the enclosure will reach a predetermined inventory.

3. The method as claimed in claim 1, further comprising:
    applying a characteristic correlation factor to the current count to generate a prediction of when the units in the enclosure will reach a predetermined inventory number.

4. The method as claimed in claim 1, wherein the remote telemetry device comprises an arm such that when the door opens, the arm slides against the door resulting in a switch event when the door is opened to the predetermined open position relative to the enclosure, the switch event resulting in sensor output.

5. A remote telemetry device for automatically auditing the number of items within an enclosure having at least one door for removal and restocking of the items, comprising:
    a remote telemetry device in communication with at least one sensor device configured to be calibrated, the calibration of the sensor device being set when the sensor device is installed based upon the size of an item, the sensor configured to detect the door opening to a calibrated door open position, data indicative of the number of items within the enclosure to determine a current count; and
    applying an historical correlation factor to correct the current count to generate a prediction of when the items in the enclosure will reach a predetermined inventory.

6. The device as claimed in claim 5, wherein the device is mechanically set during installation.

7. The device as claimed in claim 5 wherein the item is a gas cylinder.

8. The remote telemetry device as claimed in claim 5, further comprising an arm such that when the door opens, the arm slides against the door resulting in a switch event when the door is opened to predetermined open position relative to the enclosure, the switch event resulting in sensor output.

9. A remote telemetry device for automatically auditing the number of items within an enclosure having at least one door for removal and restocking of the items, comprising:
- a remote telemetry device in communication with at least one sensor device configured to be calibrated, the calibration of the sensor device being set when the sensor device is installed based upon the size of an item, the sensor configured to detect the door opening to a calibrated door open position, data indicative of the number of items within the enclosure to determine a current count; and
- applying a characteristic correlation factor to the current count to generate a prediction of when the items in the enclosure will reach a predetermined inventory number.

10. The device as claimed in claim 9, wherein the device is mechanically set during installation.

11. The remote telemetry device as claimed in claim 9, further comprising an arm such that when the door opens, the arm slides against the door resulting in a switch event when the door is opened to predetermined open position relative to the enclosure, the switch event resulting in sensor output.

12. The device as claimed in claim 9 wherein the item is a gas cylinder.

* * * * *